(12) United States Patent
Nakagawa et al.

(10) Patent No.: US 6,534,885 B2
(45) Date of Patent: Mar. 18, 2003

(54) ADAPTER FOR DC POWER SOURCE UNIT

(75) Inventors: Atsushi Nakagawa, Hitachinaka (JP); Eiji Nakayama, Hitachinaka (JP); Takeshi Takeda, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 42 days.

(21) Appl. No.: 09/785,393

(22) Filed: Feb. 20, 2001

(65) Prior Publication Data

US 2001/0015579 A1 Aug. 23, 2001

(30) Foreign Application Priority Data

Feb. 18, 2000 (JP) ........................................ 2000-040471

(51) Int. Cl.$^7$ .................................................. H02J 1/00
(52) U.S. Cl. ........................................ 307/150; 307/154
(58) Field of Search ................................. 307/150, 149, 307/154–156

(56) References Cited

U.S. PATENT DOCUMENTS

| | | | | |
|---|---|---|---|---|
| 4,957,831 A | * | 9/1990 | Meredith et al. ............. 307/150 |
| 5,715,156 A | * | 2/1998 | Yilmaz et al. ................. 307/26 |
| 5,929,597 A | * | 7/1999 | Pfeifer et al. ................. 320/107 |
| 6,005,489 A | * | 12/1999 | Siegle et al. .................. 310/50 |
| 6,087,815 A | * | 7/2000 | Pfeifer et al. ................. 323/282 |
| 6,104,162 A | * | 8/2000 | Sainsbury et al. ........... 320/107 |
| 6,172,860 B1 | | 1/2001 | Yoshimizu et al. ........... 361/25 |

\* cited by examiner

*Primary Examiner*—Fritz Fleming
(74) *Attorney, Agent, or Firm*—Sughrue Mion, PLLC

(57) ABSTRACT

An adapter includes a cord, a fitting portion, a voltage setting unit, and a fitting prevention mechanism. The cord is adapted to connect to a DC power source unit in order to receive DC voltage from the DC power source unit. The fitting portion is for insertion into the battery holding space of any one of a plurality of cordless power tools. The fitting portion receives the DC voltage received through the cord and supplies the DC voltage to a cordless power tool in which the fitting portion is properly inserted. The voltage setting unit is for setting voltage supplied through the fitting portion to the cordless power tool. The fitting prevention mechanism operates in linked association with operation of the voltage setting unit to prevent proper insertion of the fitting portion into a cordless power tool that has a rated voltage different from the voltage set by the voltage setting unit.

19 Claims, 10 Drawing Sheets

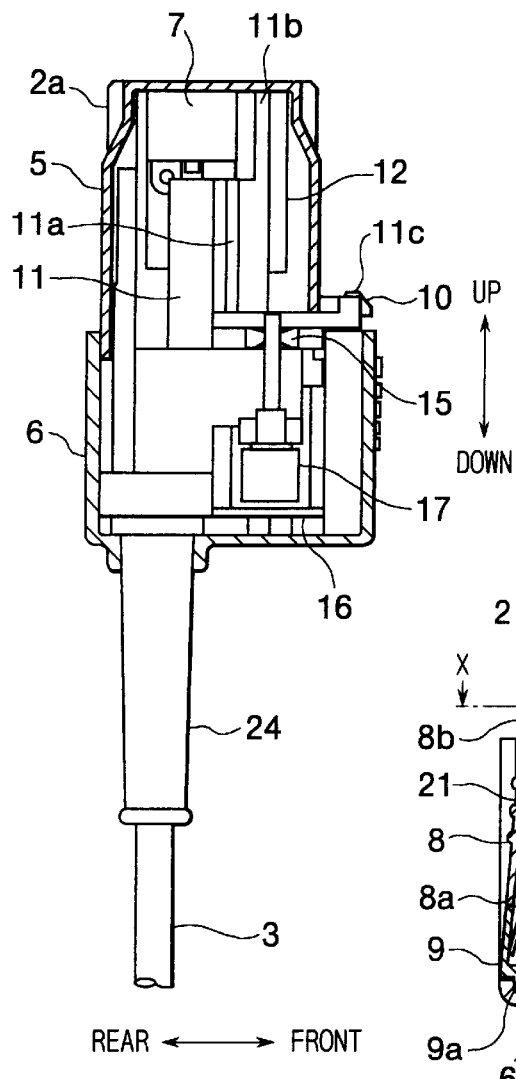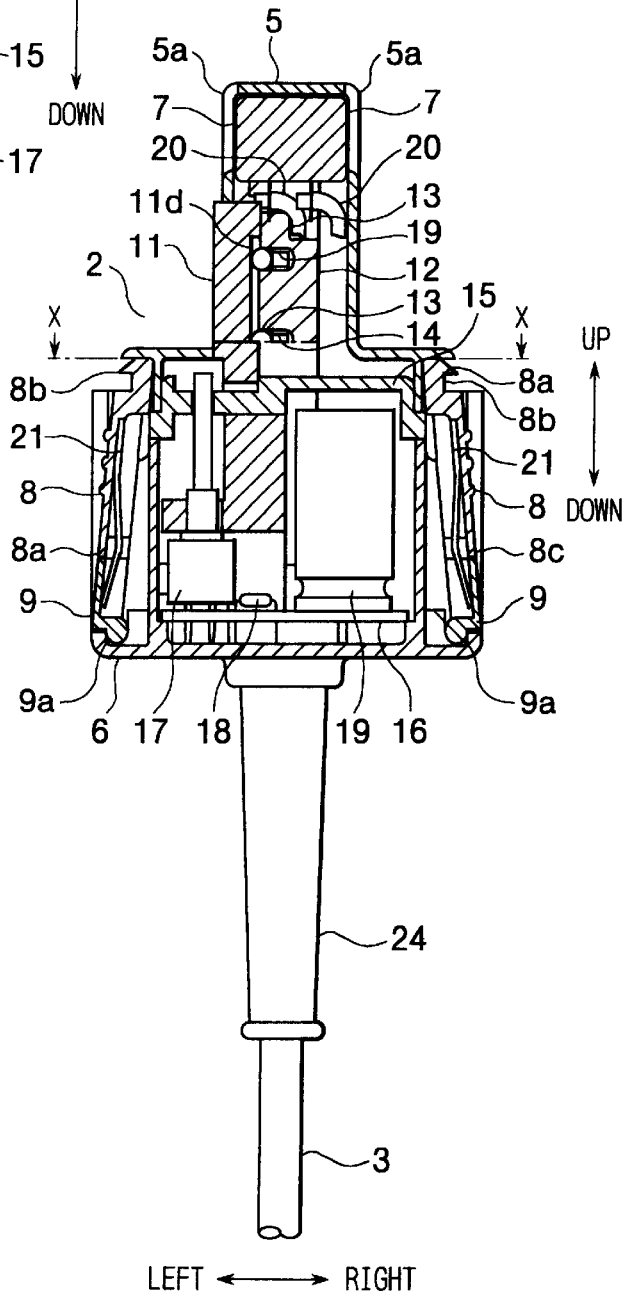

ADAPTER FOR DC POWER SOURCE UNIT

BACKGROUND OF THE INVENTION

1. Field of the Invention

The present invention relates to an adapter for a DC power source unit that converts AC voltage from a commercial power source into DC voltage, the adapter supplying the DC voltage to a cordless power tool.

2. Description of the Related Art

Battery packs normally include a plurality of 1.2V cells connected together to produce a voltage of 9.6V, 12.0V, 14.4V and the like, to match the rated voltage of a power tool. Because the number of connected cells varies with the type of battery pack, the different battery packs have different external shapes.

FIGS. 1(a) to 3(b) show examples of battery packs. FIGS. 1(a) and 1(b) are plan and side views, respectively, showing a battery pack 28 with eight 1.2V cells connected together to produce a 9.6V output. FIGS. 2(a) and 2(b) are plan and side views, respectively, showing a battery pack 29 with ten 1.2V cells connected together to produce a 12.0V output. FIGS. 3(a) and 3(b) are plan and side views, respectively, showing a battery pack 30 with twelve 1.2V cells connected together to produce a 14.4V output.

As shown in FIGS. 1(a) and 1(b), the 9.6V battery pack 28 includes a fitting portion 28a. The fitting portion 28a includes a protruding portion 28b and a groove 28c. The fitting portion 28a is adapted to fit into a battery holding space of a power tool (not shown) with a rated voltage of 9.6V (referred to as 9.6V power tool herein after). The battery holding space includes a groove portion that engages with the protruding portion 28b, and a protruding portion that engages with the groove 28c, when the fitting portion 28a is properly inserted into the battery holding space.

The 12.0V battery pack 29 shown in FIGS. 2(a) and 2(b) is provided with a fitting portion 29a. The fitting portion 29a includes a protruding portion 29b with the same shape as the protruding portion 28b of the battery pack 28. Although not shown, a battery holding space of a 12.0V power tool is provided with a groove portion that engages with the protruding portion 29b when the fitting portion 29a of the battery pack 29 is properly inserted into the battery holding space.

When a user attempts to insert the 12.0V battery pack 29 into the 9.6V power tool, the upper end of the fitting portion 29a will abut against the protruding portion provided in the battery holding space of the 9.6V power tool, so that the fitting portion 29a can not be properly inserted into the battery holding space. Because improper 12.0V voltage will not be supplied to the 9.6V power tool, the life of the power tool will not be reduced by improper voltage supply. It should be noted that there is little risk of reducing the life of the 12.0V power tool by driving the 12.0V power tool using the 9.6V battery pack 28. Therefore, the fitting portion 28a of the 9.6V battery pack 28 is configured so that it can be inserted into the battery holding portion of the 12.0V power tool.

Further, as shown in FIGS. 3(a) and 3(b), the 14.4V battery pack 30 includes an fitting portion 30a. The fitting portion 30a has a protruding portion 30b provided at a different position than of the protruding portions 28b, 29b of the battery packs 28, 29. Although not shown, the battery holding space of a 14.4V power tool is provided with a groove portion that engages with the protruding portion 30b when the fitting portion 30a of the battery pack 30 is inserted into the battery holding space of the 14.4V power tool.

With this configuration, when a user attempts to insert the 14.4V battery pack 30 into the 9.6V power tool or the 12.0V power tool, the protruding portion 30b of the battery pack 30 will abut against the lower edge of the battery holding space of the power tool, so that the fitting portion 30a can not be inserted into the battery holding portion. Similarly, when a user attempts to insert the 9.6V battery pack 28 or the 12.0V battery pack 29 into the 14.4V power tool, the protruding portion 28b or 29b of the battery packs 28, 29 will abut against the lower edge of the battery holding space of the 14.4V power tool, so that the fitting portion 28a or 29a of the battery packs can not be inserted into the battery holding space.

Note that the battery packs 28, 29, 30 are formed with protruding portions 28b, 29b, 30b on only one side of the fitting portions 28a, 29a, 30a. With this configuration, the fitting portions 28a, 29a, 30a can not be inserted in the battery holding portions with polarities reversed, even into a power tool with the corresponding rated voltage.

The battery packs 28, 29, 30 are provided with latches 31, 32 that engage with corresponding engagement portion (not shown) of the power tools, and fix the battery packs 28, 29, 30 in the power tools, when the fitting portions 28a, 29a, 30a are properly inserted into the battery holding spaces of the power tools.

As shown in FIGS. 1(a) to 2(b), the 9.6V and 12.0V battery packs 28, 29 both have a latch 31 with the same shape and provided at substantially the same position. A protrusion 29c is provided near the latch 31 of the battery pack 29.

Although not shown in the drawings, the 9.6V and 12.0V power tools are provided with an engagement portion that engages with the latch 31 when the fitting portion 28a, 29a of the battery pack 28, 29 is properly inserted into the battery holding space of a power tool that has a rated voltage that matches the output voltage of the battery pack 28, 29. The 12.0V power tool is also provided with a groove portion adjacent to the engagement portion that engages with the latch 31. This groove portion matches the protruding portion 29c. With this configuration, the power packs 28, 29 can be attached to the corresponding power tools.

Because the battery pack 29 is provided with the protruding portion 29c, even if the fitting portion 29a is somehow actually inserted into the battery holding space of the 9.6V power tool, the protruding portion 29c will abut against the lower edge of the power tool. This prevents the latch 31 and the engagement portion of the power tool from engaging together, so the battery pack 29 can not be properly mounted. It should be noted that it is possible to mount the 9.6V battery pack 28 into the 12.0V power tool.

As shown in FIGS. 3(a) and 3(b), the latches 32 of the 14.4V battery pack 30 are provided at two positions, both different from the latches 31 of the battery packs 28, 29. That is, the latches 32 are provided at two opposite sides of the battery pack 30, whereas the latches 31 are provided at a single front surface of the battery packs 28, 29. Accordingly, the 14.4V power tool is provided with two engagement portions at opposing sides thereof, for engaging with the latches 32 when connected to the battery pack 30.

Because the 14.4V battery pack 30 has latches 32 positioned at different locations than the latches 31 of either the 9.6V battery pack 28 or the 12.0V battery pack 29, even if somehow the fitting portion 30a of the battery pack 30 is actually inserted into the battery holding space of the 9.6V power tool or the 12.0V power tool, the latch could not possibly engage with the engagement portion of the power tool, so the battery pack 30 could not be properly mounted. Also, even if the 9.6V battery pack 28 or the 12.0V battery pack 29 were somehow inserted in the 14.4 power tool, the latch 31 could not be engaged with engagement portion of the 14.4 power tool.

By designing the power tools and the battery packs 28 to 30 in this manner, the fitting portion of a battery pack can not be inserted into the battery holding space of a power tool when the battery pack has a larger or different output voltage than the rated voltage of the power tool. Also, a battery pack can not be properly attached to a power tool when the battery pack has an output voltage that is larger or different from the rated voltage of the power tool. With this configuration, battery packs are prevented from being used with power tools when the battery packs have larger or different output voltage than the rated voltage of the power tool. This prevents related reduction in the life of the power tool and decrease in efficiency.

FIG. 4 shows an example of a conventional DC power source. The DC power source includes a main body 1, an adapter 200, and a power cord 4. The adapter 200 includes a connecting cord 300 that is connected at one end to the main body 1.

The adapter 200 has the same shape as the battery pack (not shown) that corresponds to a power tool 33, so that the adapter 200 can be mounted in the power tool 33. The main body 1 outputs a DC voltage that is supplied to the power tool 33 through the connecting cord 300 and the adapter 200.

The battery holding space of the power tool 33 has a shape that depends on the rated voltage of the power tool 33 in the manner described above. Therefore, a plurality of adapters 200 are provided, each matching the shape of the battery holding space of a power tool 33 with a different rated voltage. For example, the adapter 200 for a 9.6V power tool 33 has the same shape as the 9.6V battery pack 28, and the adapter 200 for a 14.4V power tool 33 has the same shape as the 14.4V battery pack 30. Once the proper adapter 200 is inserted into the corresponding power tool, the user sets the output voltage from the main body 1 according to the rated voltage of the power tool 33.

SUMMARY OF THE INVENTION

In this way, the conventional DC power source is provided with a plurality of different adapters 200, each corresponding to a power tool 33 with a different rated voltage. The different adapters 200 and the output voltage from the main body 1 are selected according to the power tool 33 that the DC power source is used with. For this reason, in order to use a power tool 33 with a different rated voltage, the output voltage from the main body 1 must again be set and the adapter 200 connected to the main body must also be switched. This operation is complicated. Also, the user must carry around a plurality of adapters 200, which is troublesome and inefficient.

It is an objective of the present invention to overcome the above-described problems, and provide a single adapter that can supply DC voltage from a DC voltage source to a plurality of power tools with different rated voltages.

In order to achieve the above-described objective, an adapter according to one aspect of the present invention includes a cord, a fitting portion, a voltage setting unit, and a fitting prevention mechanism. The cord is adapted to connect to a DC power source unit in order to receive DC voltage from the DC power source unit. The fitting portion is for insertion into the battery holding space of any one of a plurality of cordless power tools. The fitting portion receives the DC voltage received through the cord and supplies the DC voltage to a cordless power tool in which the fitting portion is properly inserted. The voltage setting unit is for setting voltage supplied through the fitting portion to the cordless power tool. The fitting prevention mechanism operates in linked association with operation of the voltage setting unit to prevent proper insertion of the fitting portion into a cordless power tool that has a rated voltage different from the voltage set by the voltage setting unit. With this configuration, the same adapter for a DC voltage power source can be used with power tools having different rated voltages.

An adapter according to another aspect of the present invention includes a cord, a fitting portion, and a mounting mechanism. The cord is adapted to connect to the DC power source unit in order to receive DC voltage from the DC power source unit. The fitting portion is for insertion into the battery holding space of any of the cordless power tools. The fitting portion receives the DC voltage received through the cord and supplies the DC voltage to a cordless power tool in which the fitting portion is properly inserted. The mounting mechanism is adapted for engaging with a portion of any one of at least two cordless power tools having different rated voltages. With this configuration, the same adapter for a DC voltage power source can be used with power tools having different rated voltages.

BRIEF DESCRIPTION OF THE DRAWINGS

The above and other objects, features and advantages of the invention will become more apparent from reading the following description of the embodiment taken in connection with the accompanying drawings in which:

FIG. 7 is a cross-sectional view showing internal configuration of the adapter of FIG. 5;

FIG. 8 is a cross-sectional view taken along line VIII—VIII of FIG. 5;

DETAILED DESCRIPTION OF THE EMBODIMENT

Next, an adapter for a DC voltage source according to an embodiment of the present invention wills be described while referring to FIGS. 5 to 13(b).

Figure 5:
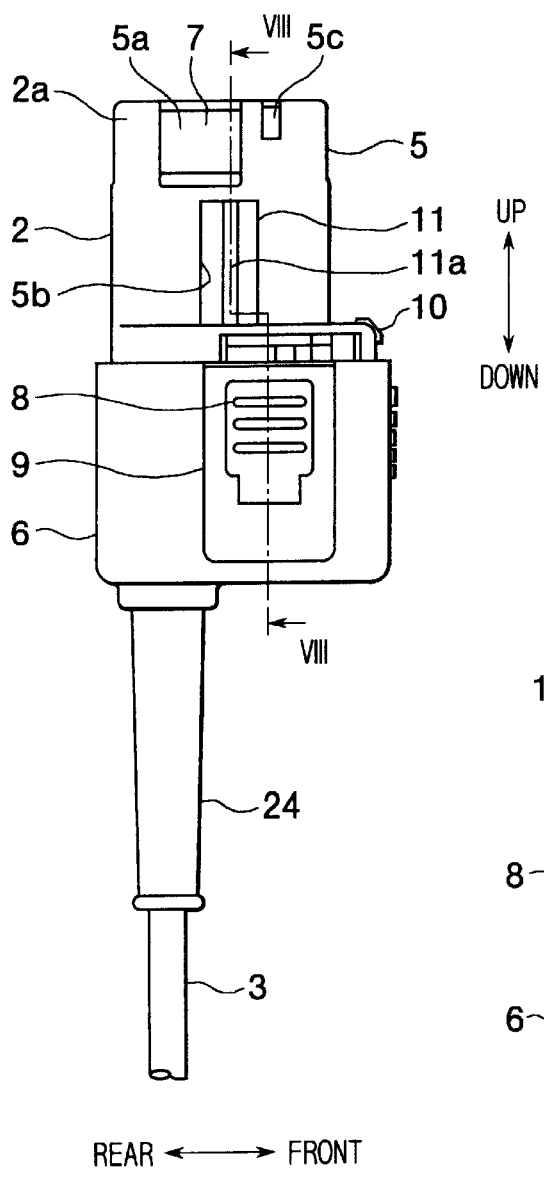
FIG. 5 is a side view of an adapter according to an embodiment of the present invention.

As shown in FIG. 5, an adapter 2 according to the present embodiment includes an upper case 5 and a lower case 6. The upper case 5 includes a fitting portion 2a. The lower case 6 includes a cord arm 24 that supports a cord 3. The cord 3 is for connecting with the main body (not shown) of a conventional DC power source.

The upper case 5 is formed with an upper hole 5a, a lower hole 5b below the upper hole 5a, and a groove 5c to the side of the upper hole 5a. The upper hole 5a exposes a terminal 7 that serves as a contact point to contact a corresponding terminal (not shown) of a power tool and supply DC voltage to a power tool.

Figure 6:
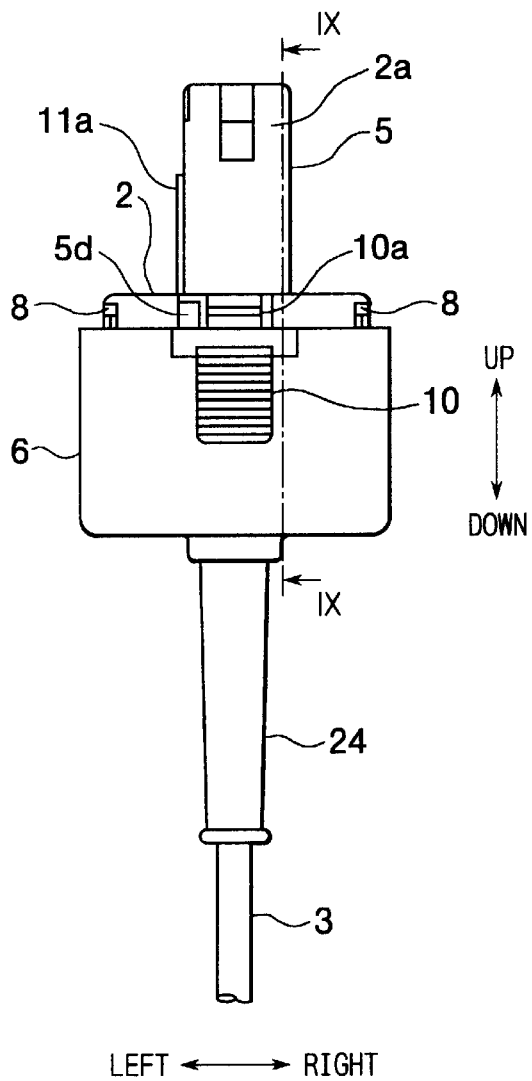
FIG. 6 is a front view of the adapter of FIG. 5.

A first latch 10 is provided to the front surface of the lower case 6. As shown in FIG. 6, a pawl portion 10a is provided at the top end of the first latch 10. The pawl portion 10a is for engaging with an engagement portion (not shown) provided to both 9.6V and 12.0V power tools. Also, second latches 8 are provided in latch holders 9 on both side surfaces of the lower case. The second latches 8 are for engaging with engagement portions (not shown) provided to a 14.4V power tool. The adapter 2 can be attached to 9.6V, 12.0V, or 14.4V power tools by the corresponding first latch 10 or the second latches 8.

A knob 11 is provided inside the cases 5, 6. The knob has a protruding portion 11a exposed through the lower hole 5b. The knob 11 is formed at its inward-facing surface with vertically-extending grooves 11d at three locations separated in the front-to-rear direction. One of the grooves 11d is shown in FIG. 8. A terminal holder 12 contacts the inner surface of the knob 11. The terminal holder 12 is provided with a ball 13 selectively engageable with the grooves 11d, and a spring 14 that constantly urges the ball 13 toward the knob 11. With this configuration, the knob 11 is movable between three different steps in the front and rear directions.

The first latch 10 is urged by an urging means (not shown), so that the pawl portion 10a constantly protrudes to the outside of the upper case 5. As shown in FIG. 6, a horizontal hole 5d is provided adjacent to the pawl portion 10a. A front end portion 11c shown in FIG. 8 of the knob 11 protrudes through the horizontal hole 5d.

Figure 9:
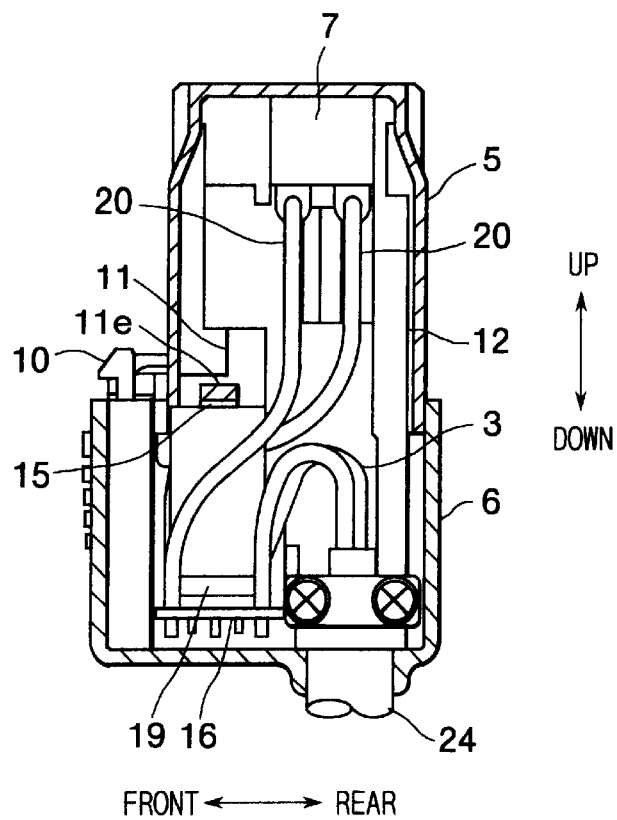
FIG. 9 is a cross-sectional view taken along line IX—IX of FIG. 6.

As shown in FIG. 9, a groove 11e is formed in the lower edge of the knob 11 in the interior of the upper and lower cases 5, 6. A lever 15, is engaged in the groove 11e, so as to move in the same direction as and in linked association with horizontal movement of the knob 11. As shown in FIG. 7, the lever 15 is engaged with a toggle switch 17, which is fixed on a circuit board 16.

When the knob 11 is moved in the horizontal direction sufficiently to overcome the urging force of the spring 14, the ball 13 becomes disengaged from one of the grooves 11d and the lever 15 moves in the same direction as the knob 11. The toggle switch 17 switches as a result.

As shown in FIG. 8, three resistors 18 (only one shown in FIG. 8) and an electrolytic capacitor 19 are provided on the circuit board 16 with the toggle switch 17. The toggle switch 17 selects one of the resisters 18 in accordance with movement of the lever 15. The resistance value of the selected resister 18 is sent to the main body of the DC power source (not shown). The main body of the DC power source determines the inputted resistance value and outputs a 9.6V, 12.0V, or 14.4V voltage, whichever corresponds to determined the resistance value. Configuration and processes for setting output voltage is shown in U.S. application Ser. No. 09/478,798, the disclosure of which is hereby incorporated by reference.

As shown in FIG. 9, the terminal 7, which is fixed to the terminal holder 12 as described above, is connected to the circuit board 16 by a lead wire 20. The end of the cord 3 supported by the cord arm 24 is also connected to the circuit board 16. The other end of the cord 3 is connected to the main body 1 of the power source as mentioned previously.

The cord 3 includes three lines, that is, two power lines for supplying power from the main body 1 of the DC power source to the power tool and a single signal line for sending a resistance value that depends on the selected resister 18 to the main body 1 of the DC power source. The cord arm 24 is formed from a resilient material. The terminal holder 12 is positioned on the cord arm 24. Resilient force of the cord arm 24 presses the terminal holder 12 between the upper and lower cases 5, 6, and fixes it in place.

The second latch 8 is partially covered by the latch holder 9. As shown in FIG. 8, the second latch 8 is pressed against the inner surface of the latch holder 9 by a plate spring 21, so that the latch holder 9 and the second latch 8 move integrally together. A pawl portion 8a is freely pivotable with respect to the latch holder 9 around a lower end 8c. The second latch 8 and the latch holder 9 are pivotable around a lower end 9a of the latch holder 9.

Figure 10:
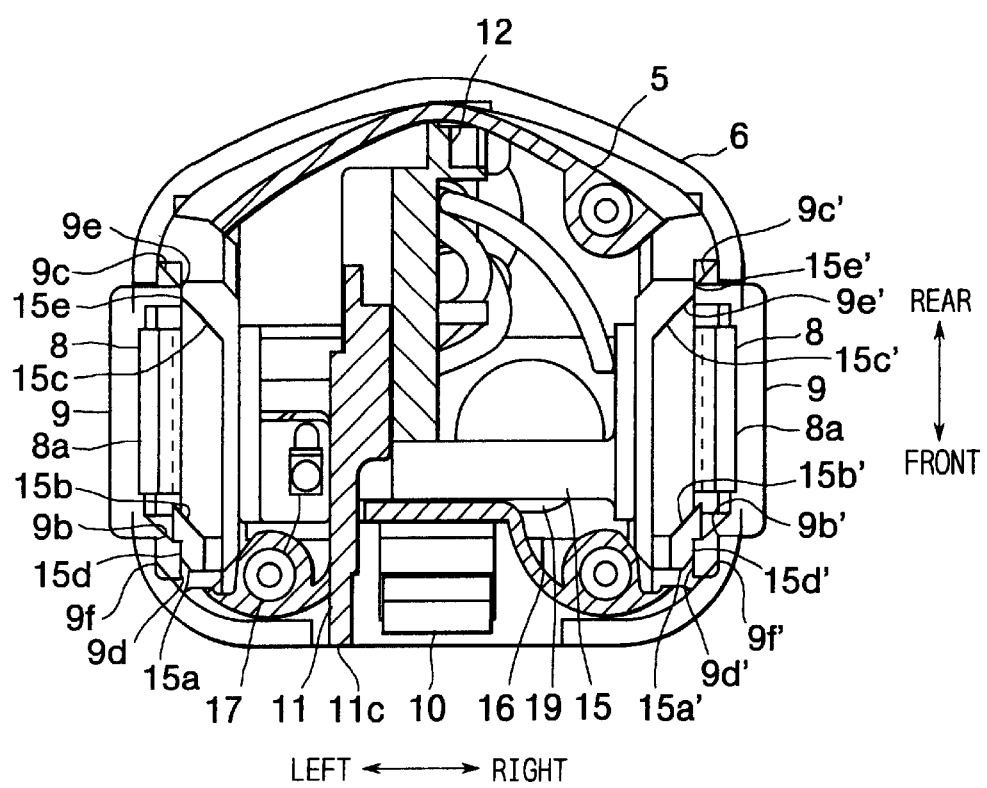
FIG. 10 is a cross-sectional view taken along line X—X of FIG. 8.
Figure 11:
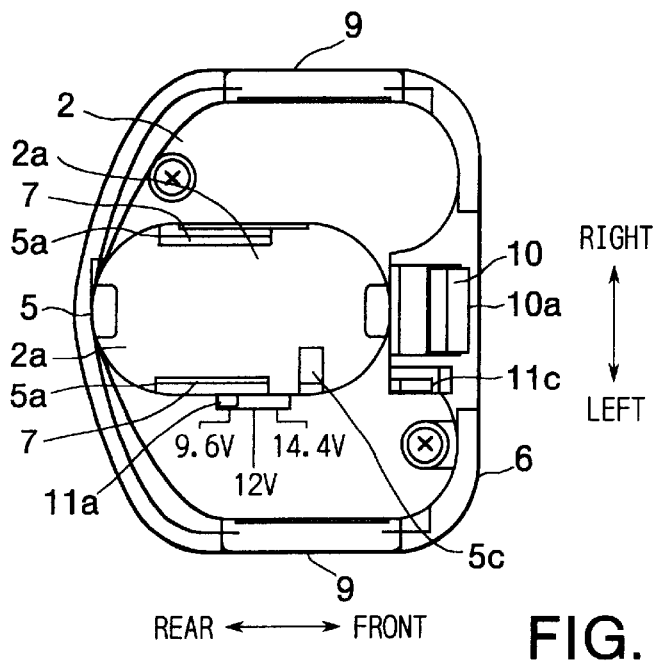
FIG. 11(a) is a plan view showing the adapter with output voltage set to 9.6V.
FIG. 11(b) is a side view showing the adapter with output voltage set to 9.6V.
Figure 11:
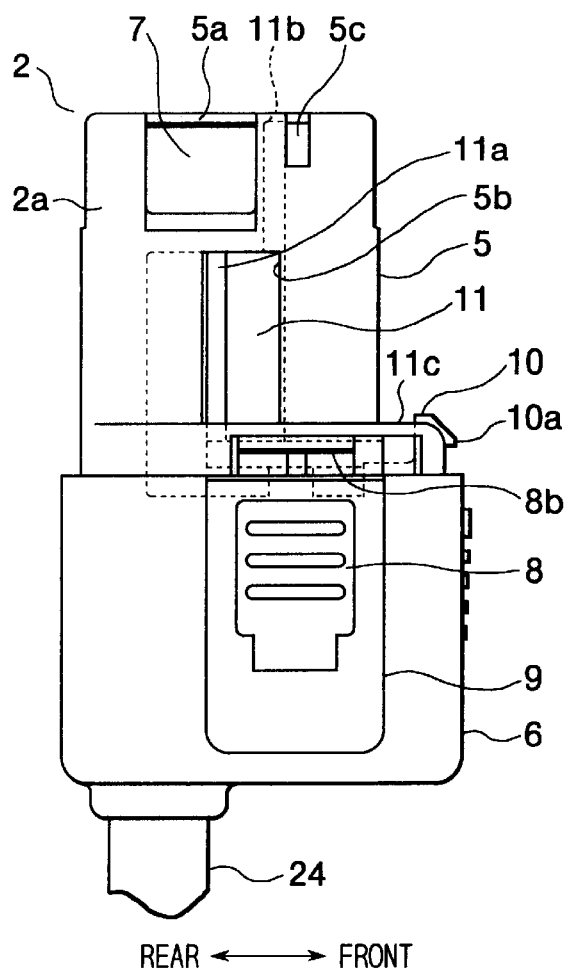
Figure 12:
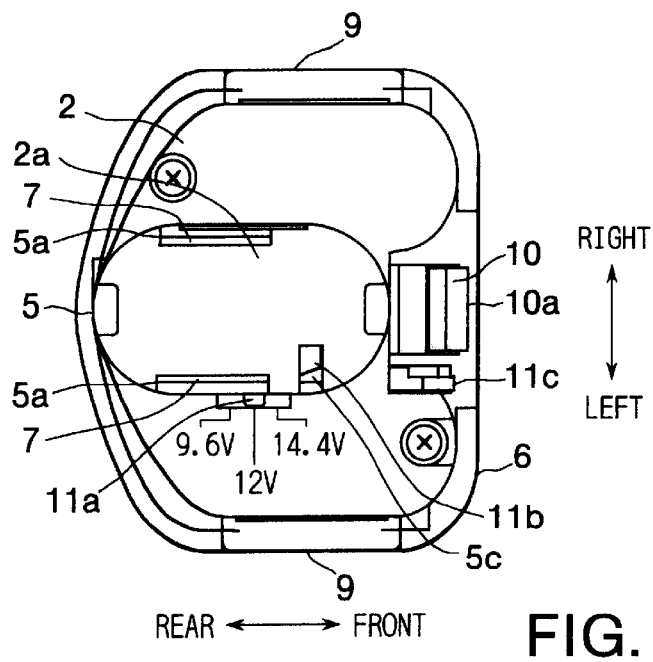
FIG. 12(a) is a plan view showing the adapter with output voltage set to 12.0V.
FIG. 12(b) is a side view showing the adapter with output voltage set to 12.0V.
Figure 12:
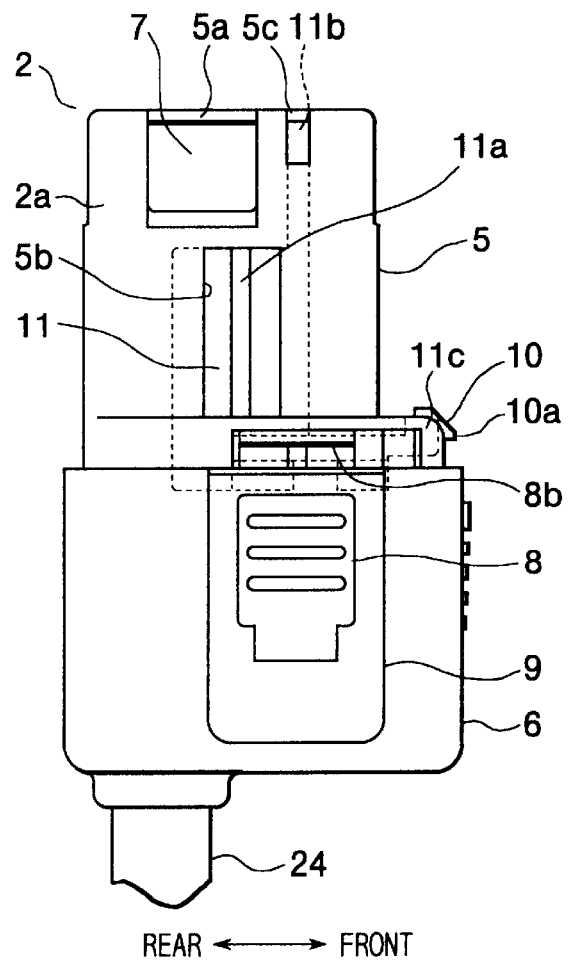
Figure 13:
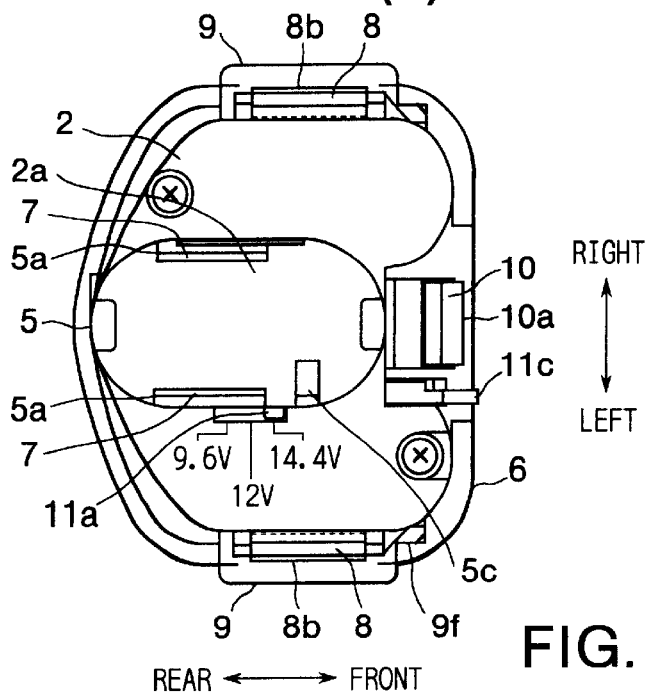
FIG. 13(a) is a plan view showing the adapter with output voltage set to 14.4V.
FIG. 13(b) is a side view showing the adapter with output voltage set to 14.4V.
Figure 13:
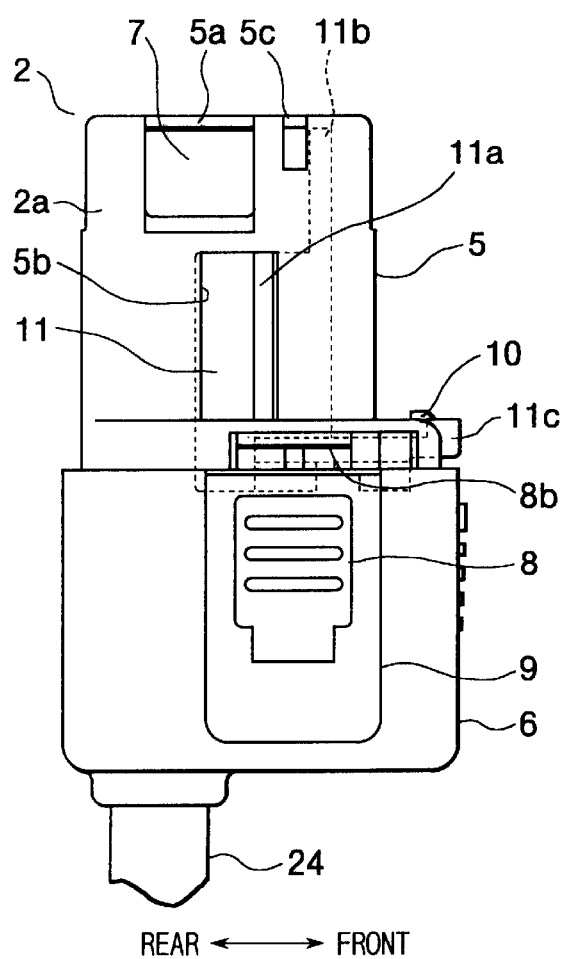

As shown in FIG. 10, the lever 15 is substantially symmetrical at left and right sides thereof, and has six cam surfaces 15a, 15b, 15c, 15a', 15b', and 15c', each with an approximately 45° slope. When the lever 15 is moved in the front and rear directions, the latch holder 9 moves in the following manner. When the lever 15 is moved in the frontwise direction, the cam surfaces 15a, 15c, 15a', and 15c' abut against slanting surfaces 9b, 9c, 9b', and 9c' of the latch holder 9. The frontward movement force of the lever 15 is divided amongst the cam surfaces and transferred to the latch holders 9, so that the latch holders 9 are pressed out the left and right side surfaces of the lower case 6. When the lever 15 is moved further in the frontwise direction to the position shown in FIG. 10, flat surfaces 15d, 15e, 15d', and 15e', which are continuous with the cam surfaces 15a, 15c, 15a', and 15c' of the lever 15, abut against flat surfaces 9d, 9e, 9d', and 9e', which are continuous with the slanted surfaces 9b, 9c, 9b', and 9c' of the latch holder 9. As a result, the lever 15 supports the latch holder 9 so that the latch holder 9 will not change position, even if the second latch 8 is pressed against the urging force of the plate spring 21 by a force greater than the plate spring 21. Also, flat surfaces 9f, 9f' are provided to the front of the second latches 8 of the latch 9. When the lever 15 is moved in the rearward direction, the cam surfaces 15b, 15b' abut against the lower portions 8c, 8c' of the pawls 8a of the second latch 8, which is assembled in the latch holder 9. The force of this rearward movement is divided amongst the cam surfaces 15b, 15b' so that the latch holder 9 retracts back into the lower case 6.

With this configuration, the adapter 2 can be prevented from being inserted into a power tool with a rated voltage that differs from the set voltage and from being inserted into a power tool the wrong way. Also, the mechanism for attaching to the adapter 2 can be selected to match the power tool. All of these operations are performed in linked association with setting of the output voltage. These operations will be described in more detail next while referring to FIGS. 11(a) to 13(b).

As shown in FIGS. 11(a) and 11(b), the protruding portion 11a of the knob 11 protrudes from the lower hole 5b of the upper case 5. The adapter 2 is set to an output voltage of 9.6V by moving the protruding portion 11a to the rearmost position. At this time, the lever 15, which is engaged with the knob 11, moves in association with movement of the knob 11. The toggle switch 17 switches so that the circuit board 16 generates a resistance value that corresponds to 9.6V. Also, the cam surfaces 15b, 15b' shown in FIG. 10 abut against the lower portions 8c, 8c' of the pawl portion 8a of the second latch 8, so that the second latch 8 and the latch holder 9 retract into the lower case 6. As indicted by dotted line in FIG. 11(b), the upper end 11b of the knob 11 moves inside the upper case 5 to a position between the groove 5c and the upper hole 5a, so that the groove opens up. The groove 5c corresponds to the groove 28c of the battery pack 28, which has an output voltage of 9.6V. When the groove 5c is opened up, the groove 5c can engage with the protruding portion (not shown) provided in the battery holding portion of a 9.6V power tool. Also, because the front end of the knob 11 is positioned as shown in FIGS. 11(a) and 11(b), it will not abut against the protruding portion provided to the power tool with a rated voltage of 9.6V. As a result, when the adapter 2 is in the condition shown in FIGS. 11(a) and 11(b), the fitting portion 2a can be inserted into the battery holding space of a power tool with a 9.6V rated voltage.

It should be noted that when the adapter 2 is in the condition shown in FIGS. 11(a) and 11(b), attachment to the power tool is performed by the first latch 10. The second latch 8 can not be involved with attachment because it is withdrawn inside the lower case 6. Also, although the fitting portion 2a can be inserted into the battery holding space of a power tool with a 12.0V rated voltage, but it can not be inserted into the battery holding space of a power tool with a 14.4V rated voltage. This is because the protruding portion 11a of the knob 11 protrudes from the side surface of the upper case 5, and so will hit against the lower edge of the battery holding space. Further, when the user attempts to insert the adapter 2 into the 9.6V power tool, with positive and negative terminals reversed, the protruding portion 11a, which protrudes from the side surface of the upper case 5, will hit against the lower edge of the battery holding space, so that the adapter 2 can not be inserted.

In order to set the output voltage of the adapter 2 to 12.0V, then the protruding portion 11a of the knob 11 is moved forward to the center position as shown in FIGS. 12(a) and 12(b). By moving the knob 11 forward in this manner, the lever 15, which is engaged with the knob 11, also moves forward, and the toggle switch 17 switches to the resister 18 that corresponds to 12.0V. At this time, the lower portions 8c, 8c' of the pawl portion 8a of the second switch 8 move from the end toward the center of the cam surfaces 15b and 15b' shown in FIG. 10. However, the cam surfaces 15a, 15c, 15a', 15c' do not reach the position where they are pressed out by the slanted surfaces 9b, 9c, 9b', 9c' of the latch holder 9. As a result, the second latch 8 and the latch holder 9 are supported in a position retracted within the lower case 6. As shown in FIGS. 12(a) and 12(b), the upper edge 11b of the knob 11 moves to the position where it covers the groove 5c of the upper case 5. If a user attempts to insert the adapter 2 into the battery holding space of a 9.6V power tool while the adapter 2 is in this condition, the upper end 11b of the knob 11 will abut against the protrusion provided in the battery holding space, so that the fitting portion 2a can not be inserted into the battery holding space. Also, as shown in FIGS. 12(a) and 12(b), the front end 11c of the knob 11 moves from the retracted condition shown in FIGS. 11(a) and 11(b) to a condition protruding to the outside of the lower case 6. If the user attempts to insert the adapter 2 into a power tool with a rated voltage of 9.6V while the adapter 2 is in this condition, the, front end 11c of the knob 11 will abut against the lower edge of the battery holding space, so that the first latch 10 and the engagement portion on the power tool can not engage.

For the above-described reasons, the fitting portion 2a of the adapter 2 can be inserted into the battery holding space of a power tool with rated voltage of 12.0V, while the adapter 2 is set to a 12.0V output voltage as shown in FIGS. 12(a) and 12(b). However, the adapter 2 can not be inserted into the battery holding space of a power tool with a rated voltage of 9.6V while the adapter 2 is set to a 12.0V output voltage as shown in FIGS. 12(a) and 12(b). It should be noted that in this condition the adapter 2 is attached to the power tool using the first latch 10. The second latch 8 is not involved with attachment because it is retracted within the lower case 6.

Also, the fitting portion 2a can not be inserted into the battery holding space of a power tool with a 14.4V rated voltage while the adapter 2 is set to a 12.0V output voltage, for the same reasons as while the adapter 2 is set with a 9.6V output voltage. Also, the protruding portion 11a of the knob 11 will prevent a user's attempts to insert the adapter 2 into the power tool with the positive and negative terminals reversed.

When the adapter 2 is set to an output voltage of 14.4 V, the protruding portion 11a of the knob 11 moves forward to the position shown in FIGS. 13(a) and 13(b). By this movement of the knob 11, the lever 15, which is engaged with the knob 11, moves also so that the toggle switch 17 selects the resistor 18 that corresponds to 14.4V. Also, as shown in FIG. 10, the cam surfaces 15a, 15c, 15a', and 15c' of the lever 15 contact the slanted surfaces 9b, 9c, 9b', and 9c' of the latch holder 9, and press the latch holder 9 to protrude out beyond the side surface of the lower case 6. Further, the flat surfaces 15d, 15e, 15d', and 15e', which are formed continuous with the cam surfaces 15a, 15c, 15a', and 15c', are supported by the flat surfaces 9d, 9e, 9d', and 9e', which are formed continuous with the slanted surfaces 9b, 9c, 9b', and 9c' of the latch holder 9. Therefore, even if the second latch 8 is pressed against the urging force of the plate spring 21, the lever 15 will support the latch holder 9 so that the position of the latch holder 9 will not change.

When the lever 11 is moved to the position indicated by broken line in FIG. 13(b), the upper end 11b of the knob 11 will move to uncover the groove 5c in the upper case 5. Also, the protruding portion 11a will move to the position for engaging with the indentation provided in the battery holding space of a power tool having a rated voltage of 14.4V. As shown in FIGS. 13(a) and 13(b), the front end 11c of the knob 11 moves further outward from the side surface of the lower case 6 than shown in FIGS. 12(a) and 12(b). For this reason, the fitting portion 2a of the adapter 2 can not be inserted into the battery holding space of a power tool with rated voltage of 9.6V or 12.0V while the adapter 2 is in the condition shown in FIGS. 13(a) and 13(b), because the protruding portion 11a and the front end 11c will abut against the lower edge of the battery holding space.

It should be noted that when the adapter 2 is attached to a power tool with rated voltage of 14.4V while the adapter 2 is in the condition shown in FIGS. 13(a) and 13(b), the flat surfaces 9f, 9f' of the latch holder 9 press against the inner surface of the cases so that the adapter 2 is held firmly in place in the battery holding space. When the flat surfaces 9f, 9f' of the latch holder 9 are pressed, then the latch holder 9 protrudes out to the right sufficiently to abut against the casing of power tools with rated voltage of 9.6V or 12.0V, and so the adapter 2 can not be inserted into 9.6V and 12.0V power tools. In this way, the adapter 2 set to an output voltage of 14.4V as shown in FIGS. 13(a) and 13(b) can not be attached to a power tool with rated voltage of 9.6V or 12.0V.

Figure 1:
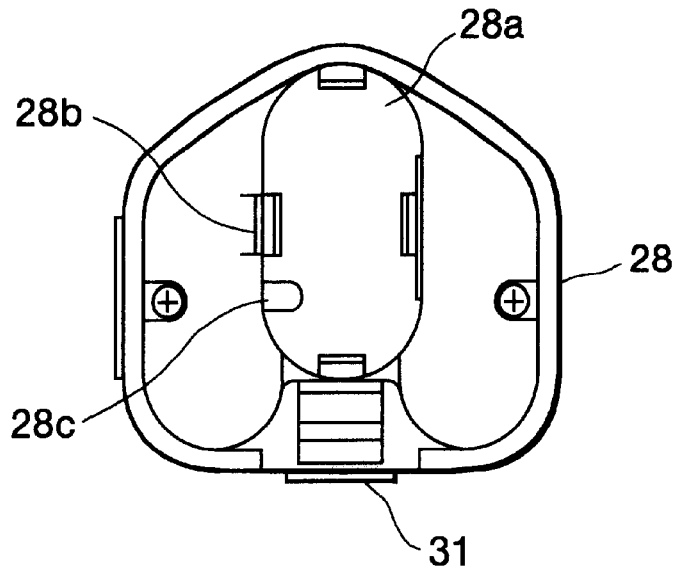
FIG. 1(a) is a plan view showing a battery pack with eight 1.2V cells connected together to produce a 9.6V output.
FIG. 1(b) is a side view of the battery pack of FIG. 1(a)
Figure 1:
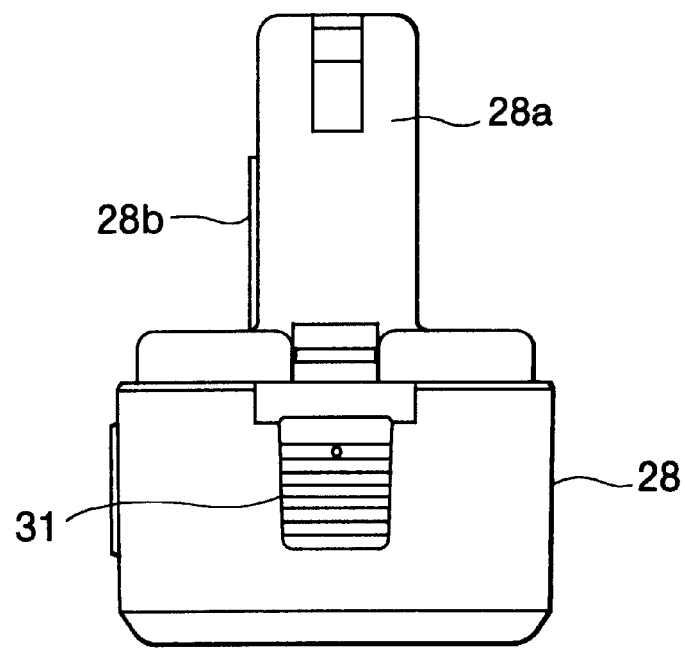
Figure 2:
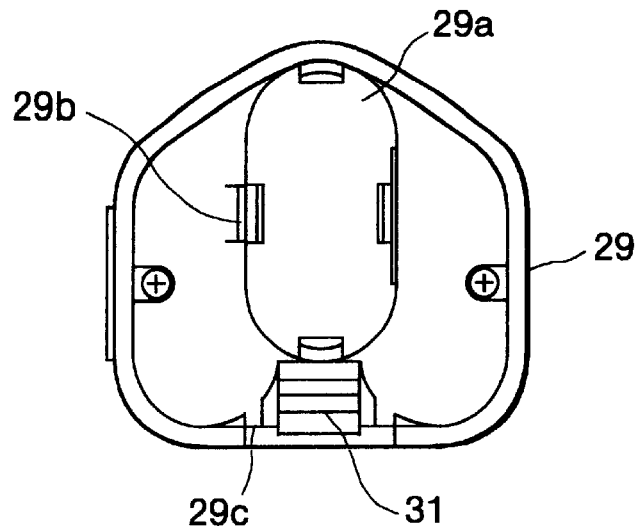
FIG. 2(a) is a plan view showing a battery pack with ten 1.2V cells connected together to produce a 12.0V output.
FIG. 2(b) is a side view showing the battery pack of FIG. 2(a)
Figure 2:
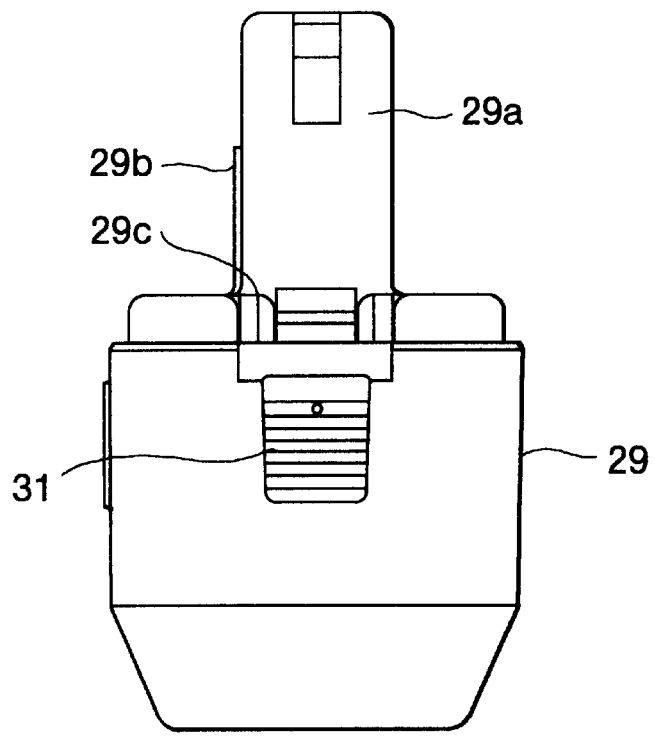
Figure 3:
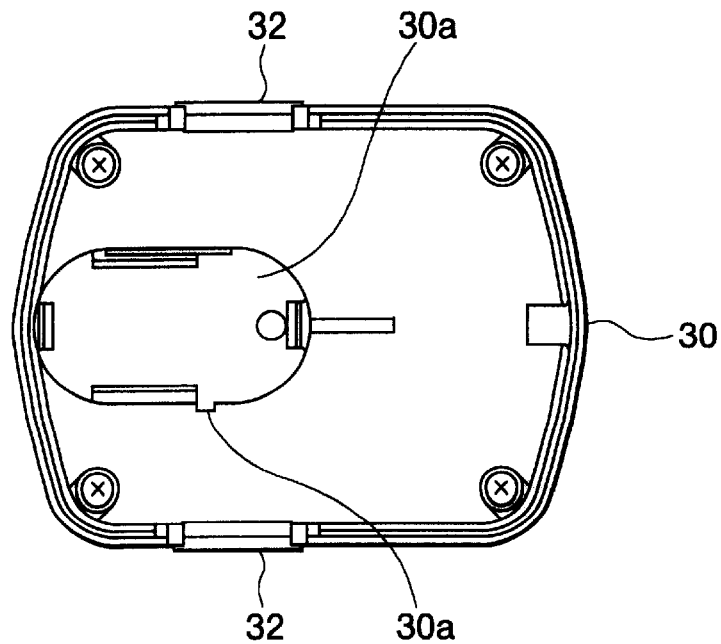
FIG. 3(a) is a plan view showing a battery pack with twelve 1.2V cells connected together to produce a 14.4V output.
FIG. 3(b) is a side view showing the battery pack of FIG. 3(a)
Figure 3:
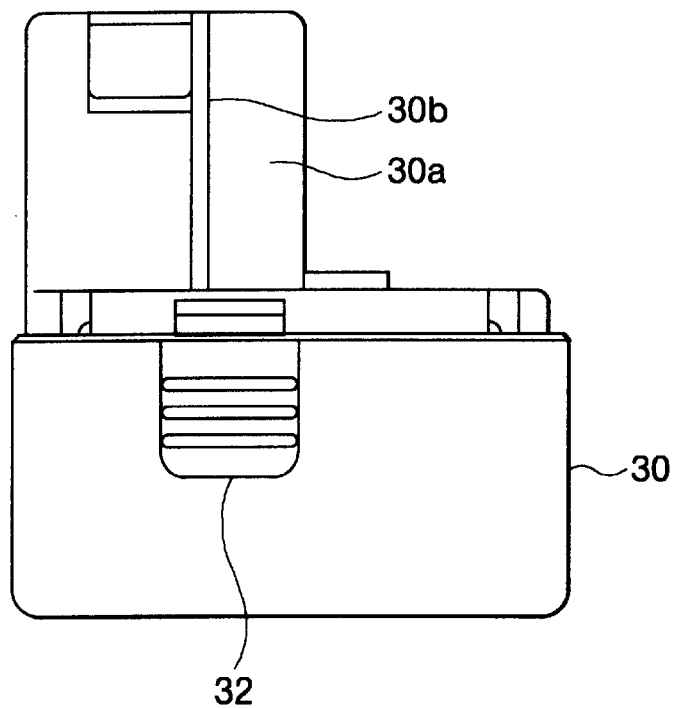
Figure 4:
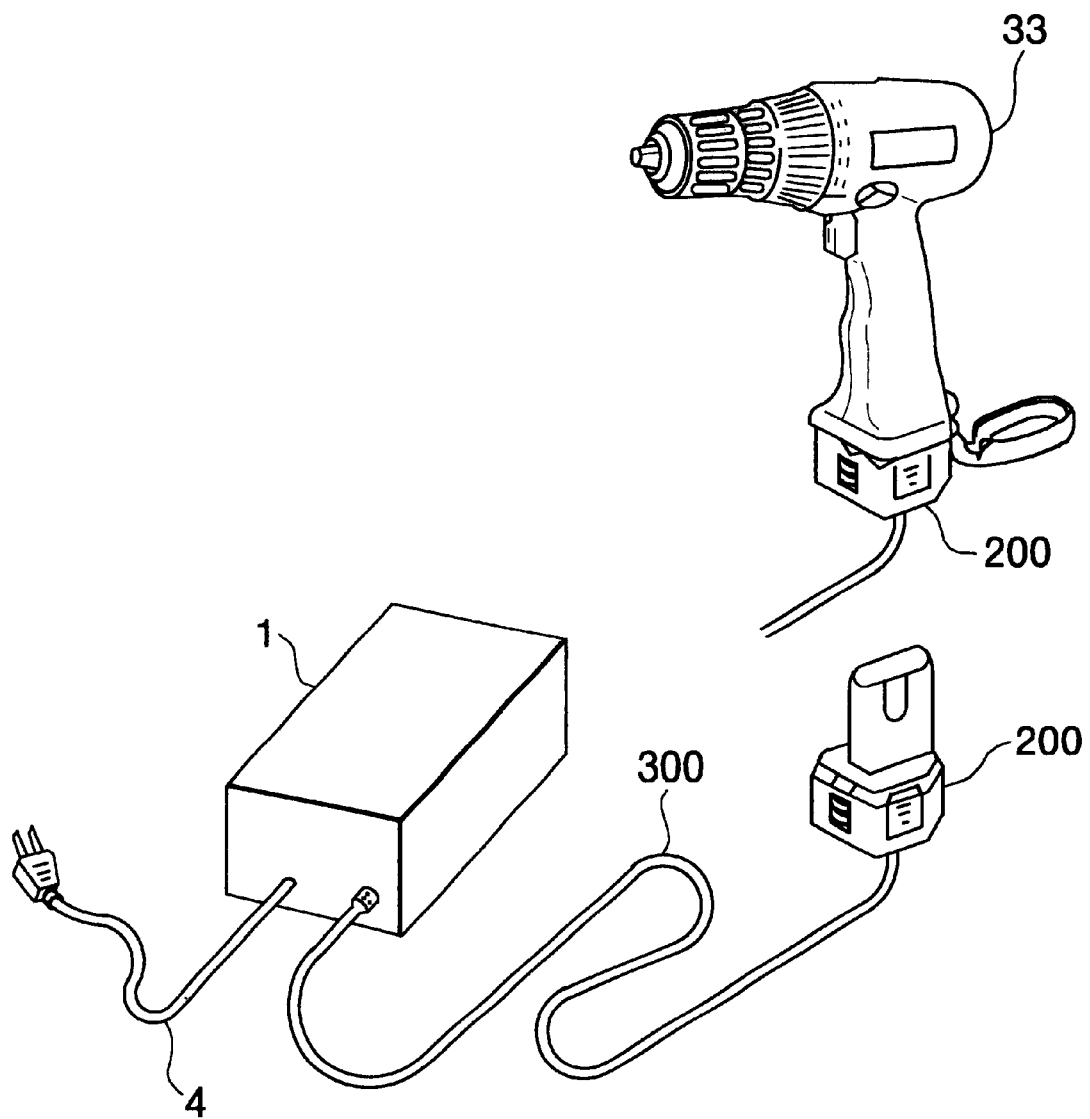
FIG. 4 is a perspective view showing a conventional DC power source for supplying DC voltage to a power tool through an adapter.

The shape of the upper case 5 is smaller than that of the 14.4V battery pack 30 shown in FIGS. 3(a) and 3(b). Therefore the front end 11c of the knob 11 will not abut against the lower edge of the battery holding space. Also, the latch 10 will not operate. Therefore, while the adapter 2 is in the condition shown in FIGS. 13(a) and 13(b), it can be inserted into a power tool with rated voltage of 14.4V.

Movement of the lever 15, which is linked with movement of the knob 11, moves the second latch 8 into a position where the second latch 8 can engage with the engagement portion in the battery holding space of a 14.4V power tool. In this way, the adapter 2 attaches to the 14.4V power tool by the second latch 8. Also, the protruding portion 11a of the knob 11 prevents the adapter 2 from being inserted into the battery holding space with positive and negative terminals reversed.

As shown in FIGS. 11(a), 12(a), and 13(a), symbols indicated the output voltage resulting from moving the protruding portion 11a are printed near the protruding portion on an upward facing surface near the lower end of the upper case 5. This increases ease of operations for setting output voltage.

Because the adapter 2 has configuration for setting the output voltage, a single adapter can be used with different power tools having different rated voltages. There is no need to provide a plurality of adapters for outputting different voltages. There is no need to change the adapter 2 when using a power tool with a different rated voltage. Operations related to the power tools can be more efficiently performed. Also, the adapter has attachment prevention configuration that prevents the adapter from attaching to power tools that have a different rated voltage that the set output voltage. The attachment prevention configuration works in linked association with the operation for setting output voltage, so that a voltage higher than the rated voltage of a power tool will not be supplied to a power tool. Reduction in life of the power tool can be prevented.

The output voltage of the adapter 2 can not be set while the fitting portion 2a of the adapter 2 is inserted in the battery holding space of the power tool, because the protruding portion 11a of the knob 11 for setting the output voltage protrudes out from the fitting portion 2a, which is inserted into the battery holding space. Therefore, there is no danger that the output voltage of the adapter 2 will be changed by a mistaken operation while using the power tool. Also, there is no danger of damaging either configuration in the battery holding space or the knob 11 by moving the knob 11 while the adapter 2 is inserted into the battery holding space of the power tool.

Also, the adapter includes configuration that engages with a portion of a power tool to attach the adapter to the power tool, and that enables attaching the adapter to a plurality of power tools with different rated voltages. As a result, a single adapter can be used with a plurality of different power tools.

While the invention has been described in detail with reference to specific embodiments thereof, it would be apparent to those skilled in the art that various changes and modifications may be made therein without departing from the spirit of the invention, the scope of which is defined by the attached claims.

For example, the embodiment describes that the adapter 2 can be connected to a power tool with rated voltage of 12.0V while the adapter 2 is set to an output voltage of 9.6V. However, the adapter can be configured so that it can not be connected to a power tool unless the adapter is set to an output voltage that is the same as the rated voltage of the power tool.

Also, in the embodiment the adapter 2 has both configuration for preventing its insertion into the battery holding space of a power tool while the adapter 2 is set to an output voltage that is greater than the rated voltage of the power tool and configuration for attaching the adapter 2 to the power tool by engaging the first latch 10 or the second latch 8 with an engagement portion of the battery holding space of a power tool. However, only one of these configurations need be provided.

What is claimed is:

1. An adapter for supplying DC voltage from a DC power source unit, which converts AC voltage into DC voltage, to cordless power tools that have different rated voltages, each power tool having a battery holding space, the adapter comprising:
    a cord adapted to connect to the DC power source unit in order to receive DC voltage from the DC power source unit;
    a fitting portion for insertion into the battery holding space of any one of the cordless power tools, the fitting portion receiving the DC voltage received through the cord and supplying the DC voltage to a cordless power tool in which the fitting portion is properly inserted;
    a voltage setting unit for setting voltage supplied through the fitting portion to the cordless power tool; and
    a fitting prevention mechanism operating in linked association with operation of the voltage setting unit to prevent proper insertion of the fitting portion into a cordless power tool that has a rated voltage different from the voltage set by the voltage setting unit.

2. The adapter as claimed in claim 1, wherein the insertion prevention mechanism operates so that the fitting portion can not be properly inserted into battery holding space of a cordless power tool that has a rated voltage less than the voltage set by the voltage setting unit.

3. An adapter as claimed in claim 1, wherein the voltage setting unit is provided in the fitting portion.

4. An adapter as claimed in claim 1, wherein the voltage setting unit prevents connecting with the cordless power tool when positive and negative terminals are reversed.

5. An adapter as claimed in claim 1, wherein the voltage setting unit includes:
    a switch for selecting different output voltage settings; and
    a knob mechanically engaged with the switch for switching the switch between different voltage settings.

6. An adapter as claimed in claim 5, further comprising a case formed with a hole for engaging with a protrusion of a power tool with a particular voltage rating, the fitting prevention mechanism including an end of the knob, the end of the knob covering the hole in the case when the knob switches the switch to a voltage setting different from the particular voltage rating.

7. An adapter as claimed in claim 5, further comprising a case, the fitting prevention mechanism including an end of the knob, the end of the knob retracting into the case when the knob switches the switch to one voltage setting and protruding out from the case when the knob switches the switch to another voltage setting.

8. An adapter for supplying DC voltage from a DC power source unit, which converts AC voltage into DC voltage, to cordless power tools that have different rated voltages, each power tool having a battery holding space, the adapter comprising:
   a cord adapted to connect to the DC power source unit in order to receive DC voltage from the DC power source unit;
   a fitting portion for insertion into the battery holding space of any one of the cordless power tools, the fitting portion receiving the DC voltage received through the cord and supplying the DC voltage to a cordless power tool in which the fitting portion is properly inserted; and
   a mounting mechanism adapted for engaging with a portion of any one of at least two cordless power tools having different rated voltages.

9. An adapter as claimed in claim 8, further comprising a voltage setting unit for performing a voltage setting operation to set voltage supplied through the fitting portion to a cordless power tool and for operating the mounting mechanism in linked association with the voltage setting operation to prevent the mounting mechanism from engaging with a cordless power tool that has a rated value that differs from the voltage set in the voltage setting operation.

10. An adapter as claimed in claim 9, wherein the voltage setting unit is provided in the fitting portion.

11. An adapter as claimed in claim 9, wherein the voltage setting unit prevents connecting with the cordless power tool when positive and negative terminals are reversed.

12. An adapter as claimed in claim 9, wherein the voltage setting unit includes:
   a switch for selecting different output voltage settings; and
   a knob mechanically engaged with the switch for switching the switch between different voltage settings.

13. An adapter as claimed in claim 12, further comprising a case, wherein the mounting portion includes:
   a latch for attaching with an engagement portion of a power tool having a particular rated voltage; and
   a linking mechanism for linking switching operation of the knob to the latch in order to extend the latch beyond the case when the knob switches the switch to a voltage setting equal to the particular rated voltage.

14. An adapter as claimed in claim 8, further comprising a voltage setting unit for performing a voltage setting operation to set voltage supplied through the fitting portion to a cordless power tool and for operating the mounting mechanism in linked association with the voltage setting operation to prevent the mounting mechanism from engaging with a cordless power tool that has a rated value that is smaller than the voltage set in the voltage setting operation.

15. An adapter as claimed in claim 14, wherein the voltage setting unit is provided in the fitting portion.

16. An adapter as claimed in claim 14, wherein the voltage setting unit prevents connecting with the cordless power tool when positive and negative terminals are reversed.

17. An adapter as claimed in claim 14, wherein the voltage setting unit includes:
   a switch for selecting different output voltage settings; and
   a knob mechanically engaged with the switch for switching the switch between different voltage settings.

18. An adapter as claimed in claim 17, further comprising a case, wherein the mounting portion includes:
   a latch for attaching with an engagement portion of a power tool having a particular rated voltage; and
   a linking mechanism for linking switching operation of the knob to the latch in order to extend the latch beyond the case when the knob switches the switch to a voltage setting equal to the particular rated voltage.

19. An adapter for supplying DC voltage from a DC power source unit, which converts AC voltage into DC voltage, to cordless power tools that have different rated voltages, each power tool having a battery holding space, the adapter comprising:
   a cord adapted to connect to the DC power source unit in order to receive DC voltage from the DC power source unit;
   a fitting portion for insertion into the battery holding space of any one of the cordless power tools, the fitting portion receiving the DC voltage received through the cord and supplying the DC voltage to a cordless power tool in which the fitting portion is properly inserted;
   a voltage setting unit for setting voltage supplied through the fitting portion to the cordless power tool; and
   a fitting prevention mechanism that changes external shape of the fitting portion in linked association with operation of the voltage setting unit in order to prevent proper insertion of the fitting portion into a cordless power tool that has a rated voltage different from the voltage set by the voltage setting unit and to enable proper insertion of the fitting portion into a cordless power tool that has a rated voltage the same as the voltage set by the voltage setting unit.

* * * * *